F. SZCZESNY.
SOLDIER'S PROTECTOR.
APPLICATION FILED JUNE 5, 1918.
1,282,315.
Patented Oct. 22, 1918.
3 SHEETS—SHEET 1.
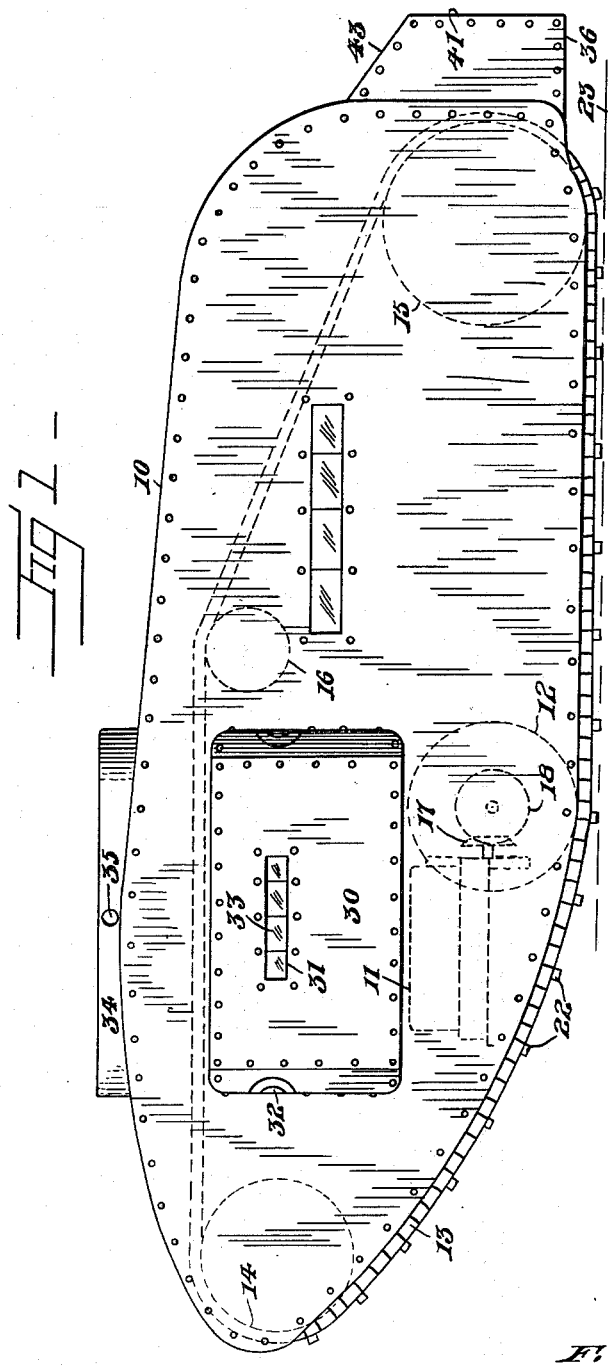
Inventor
F. Szczesny
By A. M. Wilson
Attorney

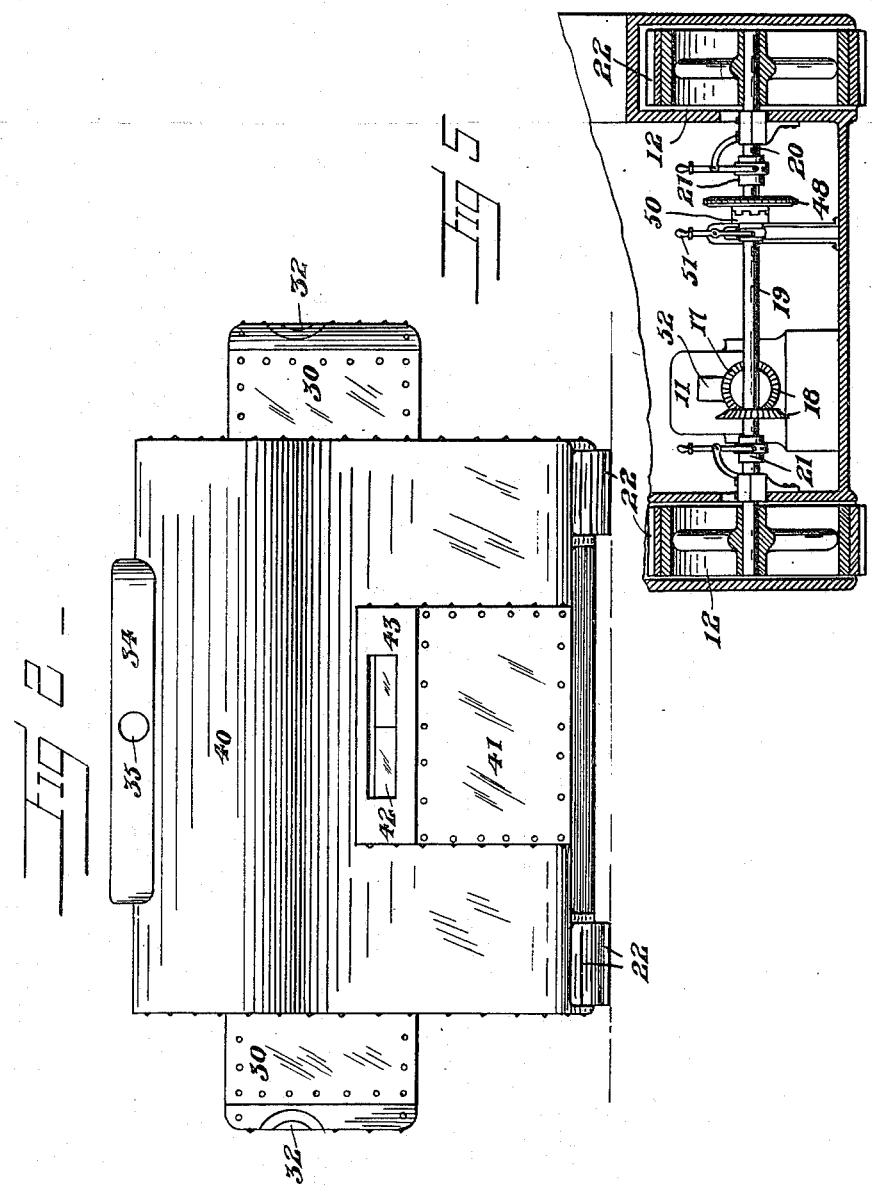

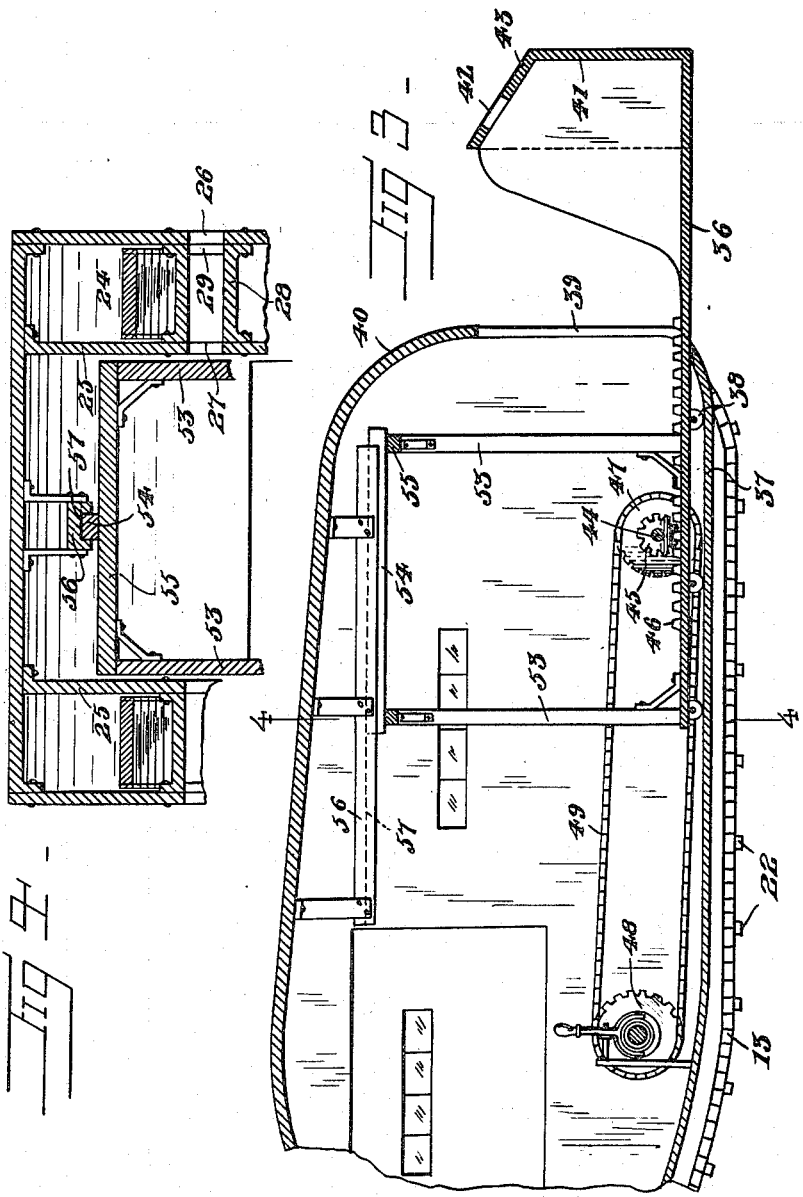

UNITED STATES PATENT OFFICE.

FRANK SZCZESNY, OF ASHUELOT, NEW HAMPSHIRE.

SOLDIER'S PROTECTOR.

1,282,315.  Specification of Letters Patent.  Patented Oct. 22, 1918.

Application filed June 5, 1918. Serial No. 238,308.

*To all whom it may concern:*

Be it known that I, FRANK SZCZESNY, a citizen of Russia, residing at Ashuelot, in the county of Cheshire and State of New Hampshire, have invented certain new and useful Improvements in Soldiers' Protectors, of which the following is a specification.

The primary object of the invention is the provision of a motor driven vehicle in the form of an armored tank provided with motor operated opening and closing means capable of bodily moving a number of soldiers outwardly or inwardly of the tank when desired without interrupting the attack upon the enemy.

A further object of the invention is to provide a protector for soldiers adapted for conveying troops into the midst of the enemy without injury from flying missiles for the purpose of alighting from the device for fighting the enemy.

A still further object of the invention is to provide an armored car for holding a large number of soldiers and capable of traveling through and over obstructions whereby the enemy's lines may be easily pierced and the troops positioned for firing upon the enemy to better advantage.

In the accompanying drawings, like reference characters designate corresponding parts throughout the several views, and Figure 1 is a side elevation of the device;

Fig. 2 is an end elevation thereof;

Fig. 3 is a vertical longitudinal sectional view of a portion of the same;

Fig. 4 is a vertical transverse sectional view of the upper portion of the device taken upon line 4—4 of Fig. 3; and Fig. 5 is a vertical transverse sectional view through the lower portion thereof taken upon a different plane from Fig. 4.

My device being in the nature of a tank comprises an elongated casing or body 10 formed of bullet proof material with a motor 11 adapted for driving wheels 12 to operate an endless belt 13 after the manner of the usual caterpillar tread. The belt 13 passes over the belt wheels 12 and idler wheels 14 and 15 arranged adjacent the opposite ends of the casing 10 as well as over centrally positioned idler wheels 16 arranged adjacent the top of the casing.

The motor 11 has a power gear 17 meshing with a pinion 18 carried by a shaft 19 within the casing 10 adapted for operative connection with the axles 20 of the wheels 12 by means of suitable controlling clutches 21. In this manner, the motor 11 turns the shaft 19 and by closing the clutches 21, operatively revolves the axles 20 and the wheels 12, thereby causing the belt 13 to travel in the desired direction over the wheels 14, 15 and 16 for moving the tank in either direction desired. Transverse cleats 22 are provided for the belt 13 for giving additional traction qualities to the belt when traveling over the ground, such as 23.

The belts 13 and the operating and carrying wheels therefor are positioned within side compartments 24 formed in the casing 10 by means of spaced partitions 25. Open ports 26 are provided in opposite sides of the casing 10 and similar ports 27 are provided in the partitions in alinement with the ports 26 having connecting tubes 28 therebetween for service in firing upon the enemy from points within the casing 10, although transparent plates 29 may be removably positioned within the tubes 28 if found desirable.

Box shaped housings 30 are provided at opposite points exteriorly of the casing 10 extending through the compartments 24 freely accessible from the interior of the car. Windows 31 and 32 are provided in said housings for firing upon the enemy although removable transparent plates 33 may be arranged for the windows 31 if desired. A turret form of dome 34 is mounted upon the casing 10 having firing ports 35 therein. A platform 36 is slidably mounted upon the bottom 37 of the casing 10 by means of rollers 38 and is adapted to longitudinally move inwardly and outwardly of an opening or doorway 39 in the end 40 of the casing. A housing or tray 41 is carried by the forward end of the platform 36, it being understood that soldiers may be positioned within said housing 41 and upon the platform 36 during the outward and inward travel of said platform and housing. A firing port 42 is provided in the inclined plate 43 of the housing 41 for firing upon the enemy, it being understood that the housing 41 closes the doorway 39 when the platform 36 is retracted while the doorway is open for the exit of the soldiers within the tank when the platform 36 is projected.

A driven shaft 44 is transversely mounted in the casing 10 having a power pinion 45 in constant mesh with a toothed rack 46 upon the platform 36. A sprocket wheel 47 carried by the shaft 44 is connected with a sprocket wheel 48 upon the power shaft 19 by means of a sprocket chain 49. The sprocket wheel 48 is operatively connected to and disconnected from the power shaft 19 by means of a clutch 50 having an operating lever 51 and it will be understood that when the shaft 19 is revolving in one direction with the clutch 50 closed, the platform 36 will be retracted while a reversing of the direction of the power shaft 19 by the ordinary reversing mechanism such as 52 will result in a reverse traveling or projecting of the platform 36. When the clutch 50 is open or disengaged, the platform 36 will be unaffected by the operation of the shaft 19.

Two frames 53 are mounted upon the platform 36 in spaced relations having a beam 54 connected between the top clutch bars 55 thereof. A guide bar 56 is suspended from the top of the casing 10 with a longitudinal groove 57 therein adapted for the slidable reception of said beam 54. In this manner, the platform 36 is guided during its reciprocation and is prevented from any tilting movement.

The complete operation of the device will be apparent from this description of the same, the car being readily propelled in either direction upon the belts 13 controlled by the separate clutches 21 and the reversing mechanism 52. The car may be filled with soldiers who can fire upon the enemy through the ports or windows 26, 31, 32, 35 and 42 when the doorway 39 is closed while by outwardly moving the platform 36, the doorway 39 is opened and the soldiers may leave the casing 10 for the purpose of fighting the enemy. The structure possesses great strength for resisting missiles and affords protection for a large number of soldiers and can be employed as a fort or tank.

What I claim as new is:

1. A tank comprising an elongated casing having a doorway in one end, partitions within the casing, spaced from the sides thereof forming compartments, a motor within the casing, endless caterpillar tread members provided for said compartments operatively connected to the said motor, and a closure for said doorway operatively connected to said motor.

2. A tank comprising an elongated casing having a door way in one end, partitions within the casing spaced from the sides thereof forming compartments, a motor within the casing, endless caterpillar tread members provided for said compartments operatively connected to the said motor, housings oppositely carried by the casing communicating with the interior of the casing, a turret mounted upon the top of the casing, a platform operatively connected to said motor movable inwardly and outwardly of the doorway, and a housing upon said platform adapted for closing said doorway when the platform is retracted.

3. A tank comprising an elongated casing having a doorway in one end, partitions within the casing spaced from the sides thereof forming compartments, a motor within the casing, endless caterpillar tread members provided for said compartments operatively connected to the said motor, housings oppositely carried by the casing communicating with the interior of the casing, a turret mounted upon the top of the casing, a platform operatively connected to said motor movable inwardly and outwardly of the doorway, a housing upon said platform adapted for closing said doorway when the platform is retracted, spaced frames upon said platform, a beam connecting the tops of said frames, a guide carried by the top of the casing having a longitudinal groove within which said beam is slidably positioned, and a housing upon the outer free end of the platform adapted for opening and closing said doorway when the platform is at the extreme limits of its outward and inward movements.

4. In combination with a tank comprising a casing having a doorway in one end thereof, a platform anti-frictionally mounted upon the bottom of said casing adapted for outward and inward movement through the said doorway, a housing upon the outer end of said platform having a firing port in the inclined top thereof, the said housing adapted for closing said doorway when the platform is retracted, and motor operating means for the said platform.

5. In combination with a tank comprising a casing having a doorway in one end thereof, a platform anti-frictionally mounted upon the bottom of said casing adapted for outward and inward movement through the said doorway, a housing upon the outer end of said platform having a firing port in the inclined top thereof, the said housing adapted for closing said doorway when the platform is retracted, spaced frames upon the platform, a connecting beam at the top of said frames parallel with the platform, a guide carried by the top of the casing having a longitudinal groove with the said beam slidably positioned therein, and operating means for said platform.

6. In combination with a tank comprising a casing having a doorway in one end thereof, a platform anti-frictionally mounted upon the bottom of said casing adapted for outward and inward movement through the said doorway, a housing upon the outer end of said platform having a firing port in the inclined top thereof, the said housing adapted for closing said doorway when the platform is retracted, spaced frames upon the platform, a connecting beam at the top of said frames parallel with the platform, a guide carried by the top of the casing having a longitudinal groove with the said beam slidably positioned therein, a toothed rack upon the platform, a pinion meshing with said rack, a motor for the casing, and operative connections between said pinion and motor.

7. In combination, a bullet proof casing having a doorway, caterpillar tread means for the casing, an operating motor for said means, a longitudinally movable platform within the casing projecting through said doorway, operative connections between said platform and motor, and guiding means for the platform carried by the top of the casing adapted for preventing tilting of the platform.

In testimony whereof I affix my signature.

FRANK SZCZESNY.